April 11, 1944.  E. H. HAMMOND ET AL  2,346,427
INDICATING THERMOSTAT
Filed Dec. 30, 1942  4 Sheets-Sheet 1
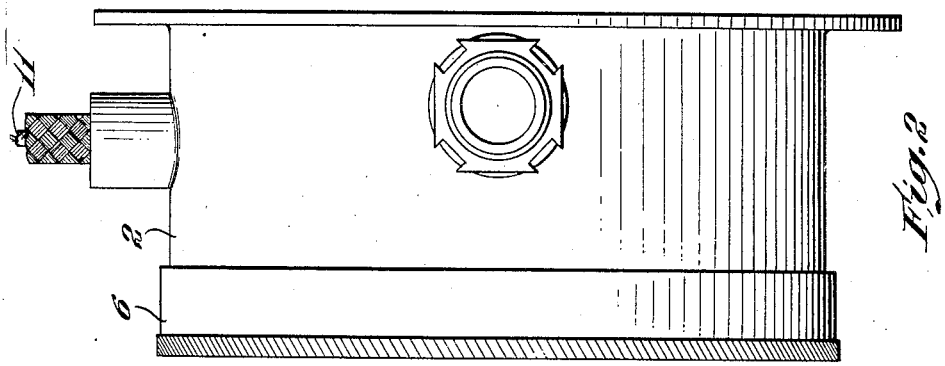
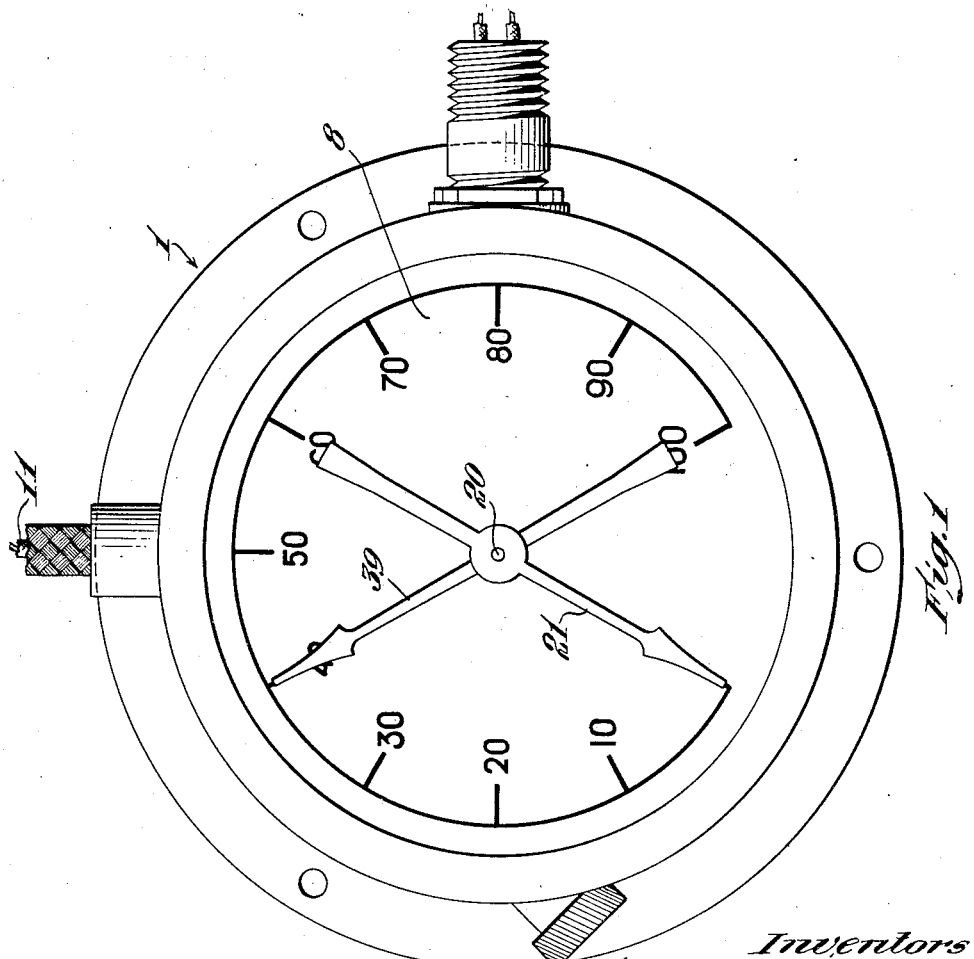
Inventors
Elmer H. Hammond
Albert J. Doser
by Roberts Cushman Woodberry
Att'ys.

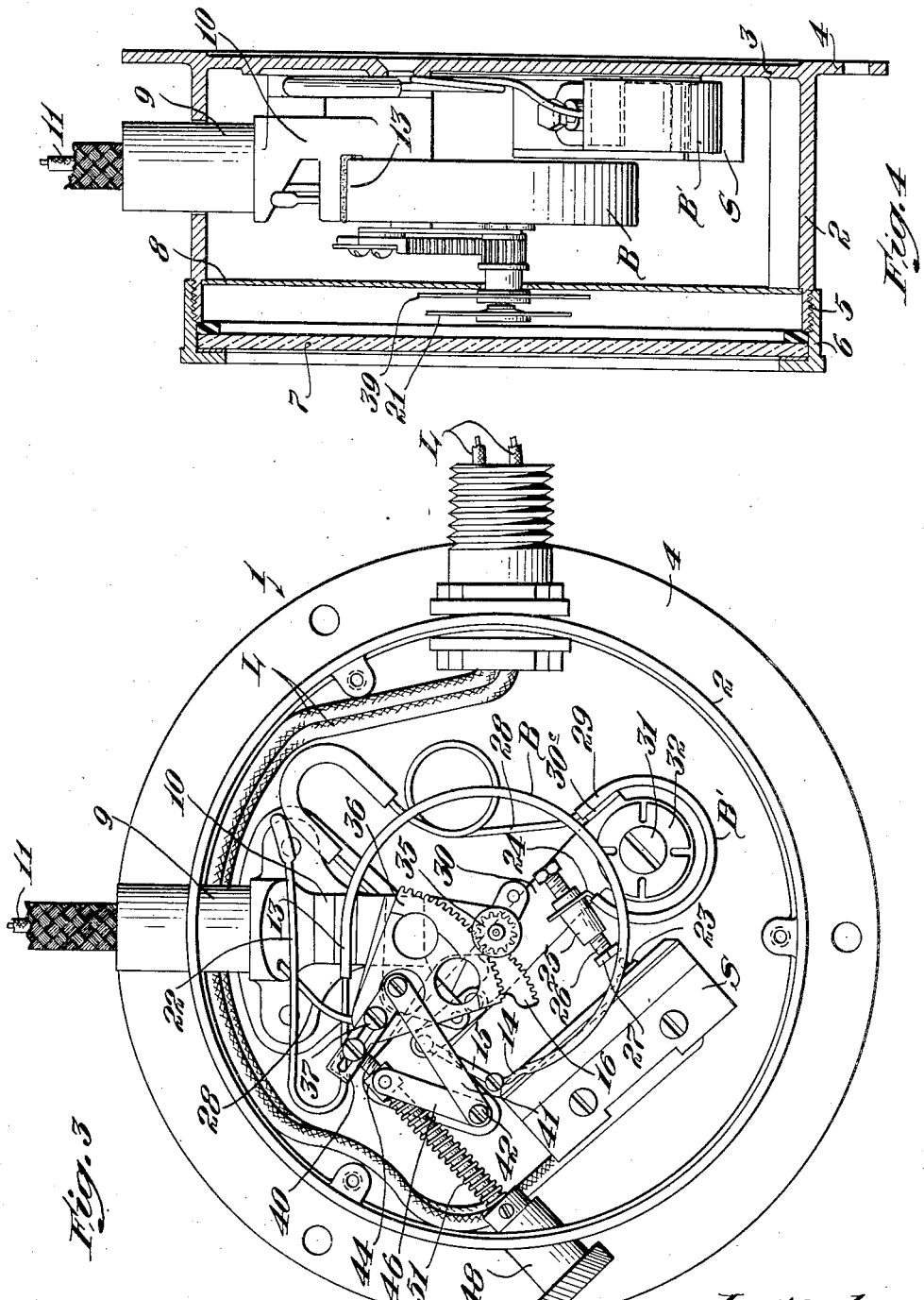

Inventors
Elmer H. Hammond
Albert J. Doser
By Roberts Cushman & Woodberry
Att'ys.

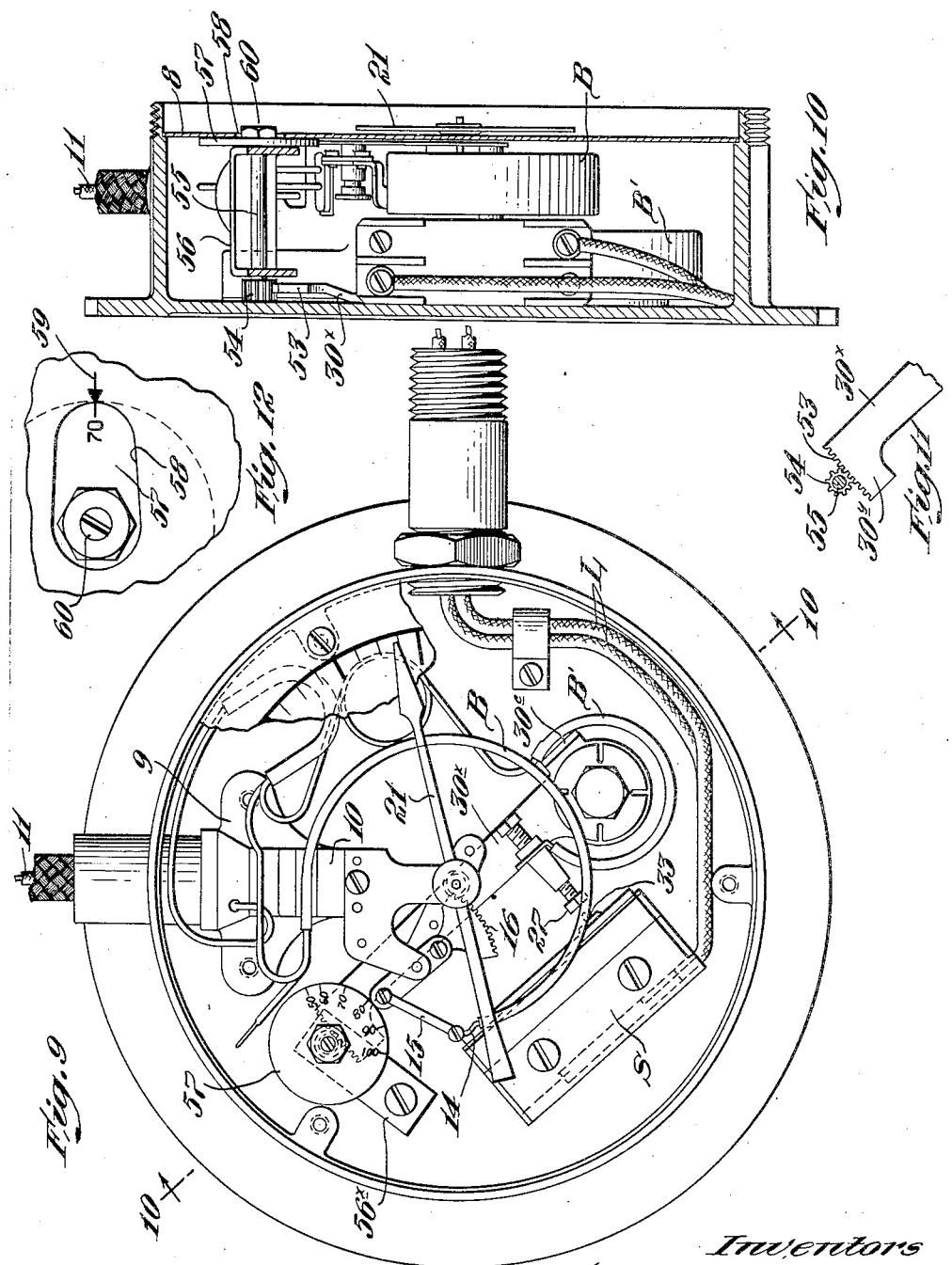

Patented Apr. 11, 1944

2,346,427

UNITED STATES PATENT OFFICE 2,346,427

INDICATING THERMOSTAT

Elmer H. Hammond, Fairfield, and Albert J. Doser, Bridgeport, Conn., assignors to Manning, Maxwell & Moore, Incorporated, New York, N. Y., a corporation of New Jersey Application December 30, 1942, Serial No. 470,532

15 Claims. (Cl. 200—56)

This invention pertains to indicating thermostats, pressurestats or similar instruments wherein appropriate index means indicates the temperature or pressure, and an electrical switch operates automatically to close or open an electrical circuit when the temperature or pressure reaches a predetermined point within the range of the instrument.

In the older forms of instrument, designed to control an open type circuit, the circuit is closed by the direct contact of the moving indicating index with an adjustable but normally fixed setting pointer, usually coaxial with the indicating index, reading to the same scale graduations as the latter, and readily accessible for manual adjustment to the desired dial reading. While simple, very easy to set and read, and dependable to operate at the exact pressure which is currently indicated by the pressure indicating index, the open circuit type of switch has certain well recognized disadvantages. To avoid these disadvantages, it has been proposed to embody a switch of the snap action type in such an instrument, for instance a switch of the kind known to the trade as a "mu" or "micro" switch. In such switches, one at least of the contacts is carried by a resilient arm, and when this arm is flexed beyond a certain point, it suddenly snaps its contact into engagement with the other contact, thereby closing the circuit. A movable actuating pin projects from the switch casing and is the immediate means for flexing the resilient arm. In embodying such a snap switch in an instrument of the class referred to, it has been customary to provide an auxiliary motor device for actuating the switch, for example, a Bourdon tube or the like in addition to the tube which operates the indicating index, both tubes being connected to the same source of variable fluid pressure.

While a snap switch of the type above referred to is compact, reliable, and from the electrical standpoint to be preferred to the old open circuit type of switch, its location within the instrument case behind the dial makes it difficult to set the switch-actuating parts accurately so as to operate at a selected pressure, as indicated on the dial by the movable indicating index, and furthermore requires skill and the use of tools for its proper accomplishment.

The present invention has for its principal object the provision (in an instrument of the class described embodying a snap switch of the type referred to) of switch setting means which is substantially as simple and as easily manipulated as switch setting means of the usual open circuit type, and which requires no especial skill or the employment of tools for its accomplishment.

A further object is to provide means for setting the switch to act at any desired predetermined pressure and having index means, for instance, a pointer, which is always operative visually to apprise the observer of the pressure at which the switch will act.

A further object is to provide switch setting means wherein an index or pointer, cooperable with a graduated dial (which may be the usual dial of the instrument) constitutes the manually actuable element by which the switch is set. Other objects and advantages of the invention will be pointed out in the following more detailed description and by reference to the accompanying drawings wherein Fig. 1 is a front elevation of an instrument embodying the present invention in a preferred construction;

Fig. 2 is a side elevation of the instrument shown in Fig. 1;

Fig. 3 is a front elevation of the same instrument but with the transparent front panel and dial removed;

Fig. 4 is a diametrical section, with certain parts in elevation, in the vertical plane of the index staff of the instrument, as shown in Fig. 3;

Fig. 9 is a front elevation similar to Fig. 3, but illustrating a modification;

Fig. 10 is a section substantially on the line 10—10 of Fig. 9;

Fig. 11 is a fragmentary front elevation of the end of the setting lever of Fig. 10 and associated parts; and Fig. 12 is a fragmentary front elevation of the dial of the instrument of Figs. 9 and 10.

Figure 5:
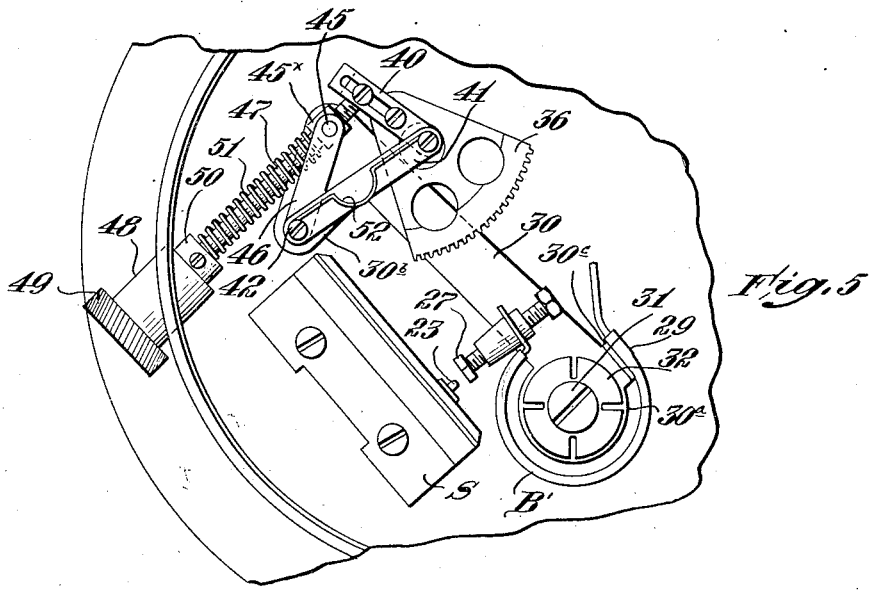
Fig. 5 is a fragmentary elevation showing details of some of the parts illustrated in Fig. 3, but omitting other parts to facilitate illustration.

Referring to the drawings, the numeral 1 designates the instrument as a whole. For convenience in illustration, this instrument is here disclosed as a thermostat of the remote reading type, wherein a bulb (not shown) filled with a thermally responsive fluid and arranged at the place whose temperature is to be controlled, is connected by a capillary tube to the instrument. However, it is to be understood that the instrument may be directly connected, by means of a suitable conduit, to any desired pressure container in which fluid pressure varies, and may be graduated to indicate such pressure variations directly rather than the equivalent thermal changes.

The instrument case may be of any conventional type, being here shown as comprising the substantially cylindrical side wall 2 integral with the rear wall 3, the latter having a radial attaching flange 4 by means of which the instrument may be mounted on a suitable support. The forward portion of the wall 2 is screw threaded at 5 for the reception of the removable cover 6. This cover comprises the transparent front panel 7, of glass or the like, and within the case and rearwardly of this panel is mounted the graduated dial 8. While one conventional type of case is thus illustrated, it is contemplated that a case of the type disclosed in the patent to Graesser No. 2,271,423, dated January 27, 1942, may well be substituted for the case herein disclosed.

Figure 6:
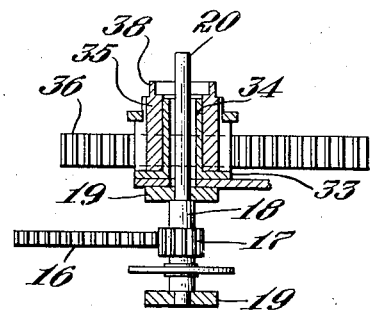
Fig. 6 is a fragmentary diametrical section through the axis of the index staff of the device of Fig. 1.

Within the case is a supporting bracket 9 which is secured to the inner surface of the rear wall of the case and which comprises a part 10 having an internal chamber with which communicates the flexible, armored capillary tube 11 which leads from the source of variable pressure. The fixed or butt end 13 of the main Bourdon tube B is secured to the bracket 9, the interior of the tube communicating with the internal chamber in the part 10. The free or tip end of the main Bourdon tube B is provided with the usual bracket or tip 14 which is connected by a link 15 to the tailpiece of a sector lever 16 suitably mounted to swing in a rigid movement frame of more or less conventional type, fixed to the bracket 9. The gear sector of the lever 16 meshes with a pinion 17 (Fig. 6) fixed to an index staff 18, which is journaled in spaced plates 19 of the instrument frame and which projects forwardly through an opening in the dial and at its forward end 20 carries the temperature or pressure indicating index 21. This index 21 is thus actuated by the main Bourdon tube B and in cooperation with the graduations of the dial 8 visually indicates the pressure at any given instant. If desired, the Bourdon tube B may be provided with a capillary filler tube 22, by means of which the system, including the tube B and capillary 11, may be filled with a suitable liquid, the tube 22 being hermetically sealed after the filling operation has been completed.

In accordance with the present invention there is mounted within the case, and preferably secured to the inner surface of the rear wall of the case, a snap switch S of a suitable type such as above referred to. This switch has an actuating pin 23 which projects from the switch case and which is pushed inwardly or depressed either to close or open the circuit, in accordance with the particular design of the switch chosen for use. For actuating this switch, a second or auxiliary Bourdon tube $B^1$ is provided. This tube, as here illustrated, may be of much smaller radius than tube B so that it occupies but little space within the case. The free end of this tube is furnished with a tip or bracket 24 which supports an internally screw-threaded sleeve in which turns an adjusting stem 26 carrying a switch-actuating pad 27 at its lower end. By turning this stem 26 in the sleeve 25, the initial distance between the pad 27 and the pin 23 may be varied. While such adjustment of the pad 27 may be desirable, as furnishing additional means for adjustment, particularly by the manufacturer, it is not essential in accordance with the present invention, which provides other and more accessible means of adjustment, about to be described.

The butt end 29 of the auxiliary Bourdon tube $B^1$ is connected by a flexible capillary tube 28 to the chamber within the socket 10, and thus the interior of the auxiliary Bourdon tube $B^1$ is always maintained at exactly the same fluid pressure as that which exists within the main Bourdon tube B.

Figure 8:
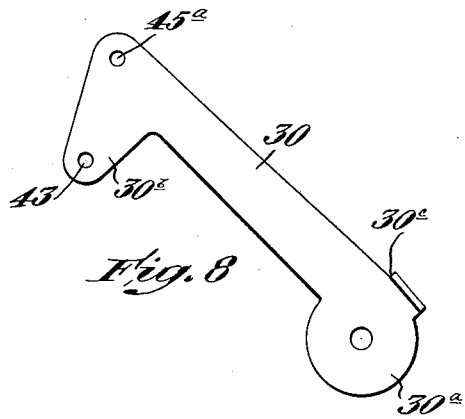
Fig. 8 is a front elevation of a setting lever.

A setting lever 30 (Fig. 8) constitutes the support for the auxiliary Bourdon tube $B^1$. This setting lever comprises a hub portion $30^a$ of substantially circular contour, having a central opening for the reception of a screw 31 (Fig. 5) or other suitable means by which the lever is pivotally attached to the rear wall of the case. Preferably a spring washer 32 is interposed between the hub $30^a$ and the head of the screw 31 to take up wear and to prevent the screw from loosening. The hub portion $30^a$ of the lever has a forwardly directed integral arm $30^c$ (Fig. 8) to which the butt end 29 of the auxiliary tube $B^1$ is soldered or otherwise permanently secured. The tube itself is normally of substantially circular curvature and embraces the circular hub $30^a$ of the lever. The opposite end of the lever is provided with an offset portion $30^b$ for a purpose hereinafter described.

The instrument frame (Fig. 6) comprises a rigid member 33 (having an opening for the passage of the index staff 18) including a forwardly directed sleeve portion 34 coaxial with the index staff and which constitutes a bearing for a pinion 35. This pinion 35 is engaged by a gear segment 36 (Fig. 3) which is pivoted to swing at the point 37 about a pivot stud carried by the instrument frame. The pinion 35 (Fig. 6) is furnished with a forwardly directed sleeve portion 38 which projects out through an opening in the dial and to which is fixed the setting pointer or index element 39 (Figs. 1 and 4). This setting pointer or index element is located forwardly of the dial but behind the index 21 and is preferably of substantially the same dimensions as the index 21 and cooperates with the same graduations of the dial as does the index 21.

Figure 7:
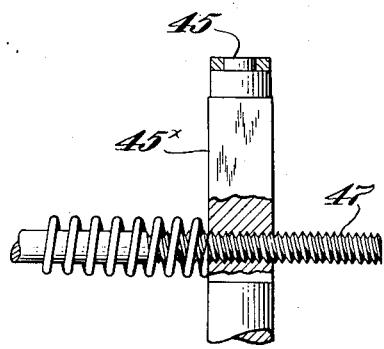
Fig. 7 is a fragmentary elevation of an adjusting rod with associated parts in section.

The gear sector 36 is furnished with an adjustable tail-piece 40 which is connected by a link 41 to the upper end of a post 42 (Figs. 3 and 5) whose lower end is fixed in an opening 43 (Fig. 8) in the lateral extension $30^b$ of the lever 30. A second post 45 (Fig. 5) is pivoted to turn in an opening $45^a$ in the free end portion of the lever 30, and its upper end is steadied by a link 46 (Fig. 3) which is connected to the top of the post 42. The post 45 is preferably provided with an enlargement $45^x$ intermediate its upper and lower ends, such enlargement here being shown of substantially square transverse section, and this enlargement has an internally screw-threaded bore which receives a screw-threaded portion of a manually rotatable switch-setting rod 47 (Figs. 5 and 7). This rod 47 extends outwardly through a journal opening in a boss 48 integral with the wall 2 of the casing, the rod being provided at its outer end with a manually actuable head 49 (preferably knurled) by means of which the rod may be turned. A collar 50 (within the casing) secured to the rod 47 prevents abnormal outward movement of the latter, while a coil spring 51 encircling the rod, bears at one end against the collar and at its opposite end against the post 44, and takes up any lost motion between the parts, thus insuring accuracy of operation. Similarly a hairpin type spring 52 (Fig. 5) may be arranged to bear at opposite ends against the post 42 and the pivotal connection of the link 41 with the tailpiece 40, respectively, thereby take up lost motion between these parts.

If the handle or head 49 be turned by hand, the rod 47 is thereby rotated, and by reason of its screw-threaded engagement with the post 45 the post is moved in a direction longitudinal of the rod 47, and since the post is supported by the free end of the lever 30, the latter is swung about the axis of the pivot screw 31. The thread on rod 47 may be fine or of low pitch and with its cooperating nut 45ᵃ may be regarded as a reduction gearing whereby a very small angular movement may be imparted to lever 30. This moves the pad 27 relatively to the end of the pin 23, and thus determines the pressure at which the pad 27 shall operatively contact the pin 23. Since any swinging motion of the free end of the lever 30 is transmitted by the link 41 to the tailpiece 40 of the segment 36, the latter is correspondingly swung concomitantly with the swinging of the auxiliary Bourdon tube B¹ and thus causes the setting pointer 39 to travel over the graduations of the dial.

Referring to Figs. 9 to 12 of the drawings, a somewhat simpler construction is illustrated, the corresponding parts bearing the same reference characters and numerals as in the arrangement previously described. In this case the lever 30 is replaced by a lever 30ˣ (Fig. 11) also constituting a support for the auxiliary Bourdon tube B¹ in the same way as above described, but in this instance the free end 30ʸ of the lever 30ˣ is provided with a gear segment 53, which meshes with a pinion 54 fixed to a shaft 55 (Fig. 10) which is journaled near its front and rear ends respectively in a bracket 56 secured at 56ˣ (Fig. 9) to the rear wall of the case. To the forward end of the shaft 55 is secured a disk 57 disposed just to the rear of the dial 8 and provided on its forward face with graduations. The dial is furnished at this point with an elongate slot 58 (Fig. 12) (here shown as oval) operative to permit a small portion of the disk 57 to be visible from the front of the instrument. Preferably the dial 8 is provided with an index mark 59 for convenience in reading the settings of the disk 57. In this instance, for setting the switch, it is necessary to take off the cover of the instrument, thus giving access to the disk 57. Preferably the shaft 55 which carries the disk 57 is furnished with a screw driver slot 60 at its front end, and by inserting a screw driver into the slot at this point, the shaft with the disk may be turned so as to bring any desired graduation of the disk opposite the index mark 59. In so setting the disk 57, the lever 30ˣ is swung concomitantly, thus actually turning the auxiliary Bourdon tube B¹ and thereby varying the initial distance between the pad 27 and the switch-actuating pin 33.

While as herein specifically illustrated and described it is the Bourdon tube which is mounted for rotative adjustment, the switch being stationary, it is obvious that a reverse arrangement, wherein the Bourdon tube would be mounted on a fixed support and the switch on a rotatable support, is within the scope of the present invention.

We claim:

1. In an instrument of the class described two relatively movable devices, one of said devices being an electrical switch of the snap-action type having an actuating element and the other of said devices being a Bourdon tube having a movable tip, and means for transmitting movement of the tube tip to the switch-actuating element, one of said devices being fixed, and a rotatable support for the other of said devices, and means for swinging the support comprising a manually rotatable element, an index so connected to said manually rotatable element as to move concomitantly with the latter, and intermeshing gear elements operative to transmit motion from the rotatable element to the support.

2. An instrument of the kind in which a case houses a graduated disk dial, and a fixed, snap-action type electrical switch comprising a movable actuating element, and a Bourdon tube for operating the switch, characterized in that the switch actuating tube is mounted on a rotatable support and in having a rotary, manually operable setting element accessible without removing the dial, connections including reduction gearing between said setting element and the tube support whereby rotation of the setting element swings the tube support and thereby varies the distance between the tip of the tube and the actuating element of the switch, a pointer cooperable with the aforesaid dial to indicate the pressure at which the switch will act, and connections between the tube support and said pointer operative to move the pointer and tube support in a constant predetermined ratio.

3. An instrument of the kind in which a case houses a graduated dial, an index staff, and a fixed electrical switch comprising a movable actuating element, and a Bourdon tube for operating the switch, characterized in having a pointer which cooperates with the graduations on the dial, said pointer being fixed to a pinion coaxial with the index staff, a gear sector meshing with said pinion, a rotatable support upon which the switch actuating tube is mounted, said support having an elongate rigid arm, a part fixed to said arm having an internally screw threaded bore, a manually rotatable setting element journaled in a bearing in the casing wall and having a handle portion outside of the casing, the inner end of said setting element being screw threaded and engaging the screw threaded bore whereby rotation of the handle swings the arm of the tube support, and means connecting the arm with the gear sector whereby movement of the arm causes the pointer to swing over the dial.

4. An instrument of the kind in which a case houses a graduated dial, an index staff carrying an index cooperable with the dial, a Bourdon tube for actuating the index, an electrical switch of the snap-action type fixed within the case and comprising a movable actuating element, and a second Bourdon tube for operating the switch, both tubes being connected to the same source of fluid pressure, characterized in having a manually actuable, rotatable setting element accessible without removal of the dial, and connections, including reduction gearing, between said setting element and the switch actuating Bourdon tube so constructed and arranged that movement of the setting element varies the initial distance between the tip of the latter tube and the actuating element of the swich.

5. An instrument of the class described, wherein two Bourdon tubes, disposed in parallel planes and each arranged to respond to internal pressure variations emanating from the same source, respectively actuate a switch and an index, the latter cooperating with a graduated disk dial, and the switch being fixed in position but including a movable actuating element, an abutment member carried by the movable tip of the tube and engageable with said switch-actuating element, thereby to operate the switch, characterized in that the switch-actuating Bourdon tube is movable as a whole relatively to the switch and in having manually operable means, including motion-reducing connections, for adjustably positioning said latter tube, thereby to vary the initial distance between the abutment member and the movable actuating element of the switch.

6. An instrument of the class described, wherein two Bourdon tubes, each arranged to respond to internal pressure variations emanating from the same source, respectively actuate a switch and an index, the latter cooperating with a graduated dial, and the switch being fixed in position but including a movable actuating element, an abutment member carried by the movable tip of the tube and engageable with said switch-actuating element, thereby to operate the switch, characterized in having a rotatable support on which the switch-actuating Bourdon tube is mounted, the parts being so relatively arranged that by swinging the support the tip of the tube may be moved toward or away from the actuating element of the switch, a manually rotatable adjusting element, and motion-reducing connections between said manually rotatable element and the tube-carrying support.

7. An instrument of the class described, wherein two Bourdon tubes, each arranged to respond to internal pressure variations emanating from the same source, respectively actuate a switch and an index, the latter moving relatively to a graduated dial in response to pressure variations and the switch being fixed in position but including a movable actuating element, an adjustable abutment member carried by the movable tip of the tube and engageable with said switch-actuating element, thereby to operate the switch, characterized in that the switch-actuating Bourdon tube is mounted to swing about a pivotal axis, thereby to vary the initial distance between the tube tip and the actuating element of the switch, and in having a second index element which moves in consonance with the pivotal movement of the switch-actuating Bourdon tube and which also cooperates with the aforesaid dial, the dial being so graduated that the latter index element always indicates the pressure at which the switch will act.

8. An instrument of the kind in which a case houses a graduated dial, an index staff carrying an index cooperable with the dial, a Bourdon tube for actuating the index, an electrical snap-action type switch fixed within the case and comprising a movable actuating element, and a second Bourdon tube for operating the switch, said second tube being movable as a whole, both tubes being connected to the same source of fluid pressure, characterized in having means located outside of the case operative to move the switch actuating tube as a whole, thereby to vary the initial position of its movable tip relatively to the actuating element of the switch.

9. An instrument of the class described, wherein two Bourdon tubes, each arranged to respond to internal pressure variations emanating from the same source, respectively actuate a switch and an index, the latter moving over a graduated dial in response to variations in fluid pressure, and the switch being fixed in position but including a movable actuating element, an abutment member carried by the movable tip of the switch actuating Bourdon tube and engageable with said switch-actuating element, thereby to operate the switch, characterized in that the switch-actuating Bourdon tube is movable as a whole thereby to vary the initial distance between its tip and the actuating element of the switch, and in having a pointer which cooperates with the same dial with which the aforesaid pressure responsive index cooperates, the parts being so designed and arranged that the reading of said pointer with reference to the dial graduations designates the pressure at which the switch will act.

10. An instrument of the kind in which a case houses a graduated dial, an index staff carrying an index which moves over the dial in response to variations in fluid pressure, a Bourdon tube for actuating the index, an electrical switch fixed within the case and comprising a movable actuating element, and a second Bourdon tube for operating the switch, both tubes being connected to the same source of fluid pressure, characterized in having a pointer which cooperates with the same dial graduations as the pressure responsive index, a movable support for the switch-actuating Bourdon tube so arranged as to permit the tip of the latter tube to be adjusted to different initial distances from the actuating element of the switch, a manually movable setting element, and connections between the setting element and the tube support and pointer respectively, said connections including a rotatable shaft having an actuating element outside of the case and being so constructed and arranged that the position of the pointer always indicates the pressure at which the switch will act.

11. An instrument of the kind in which a case houses a graduated dial, an index staff carrying an index movable over the dial in response to pressure variations, a Bourdon tube for actuating the index, a snap-action type electrical switch fixed within the case and comprising a movable actuating element, and a second Bourdon tube for operating the switch, both tubes being connected to the same source of fluid pressure characterized in having a pointer which is coaxial with the index and cooperates with the same dial graduations as the latter, a rotatable support for the switch actuating tube, a manually movable setting element located outside of the case, and connections between said setting element and the tube support and pointer respectively.

12. In an instrument wherein a Bourdon tube constitutes motor means operative by movement of the tube tip in response to internal pressure variations to actuate an electrical switch, a rotatable support to which the butt end of the tube is fixed, said support having an elongate arm by means of which the support may be turned thereby to vary the initial position of the tube tip relatively to the movable member of the switch, and means for swinging the arm comprising a manually rotatable element, an index so connected to said manually rotatable element as to move concomitantly with the latter, the arm having a part fixed thereto and which is provided with an internal screw thread, the manually rotatable element having an external thread which meshes with said internal thread and having a head by means of which it may be turned.

13. In an instrument wherein a Bourdon tube constitutes motor means operative by movement of the tube tip in response to internal pressure variations to actuate an electrical switch, a rotatable support to which the butt end of the tube is fixed, said support having an elongate arm by means of which the support may be turned thereby to vary the initial position of the tube tip relatively to the movable member of the switch, and means for swinging the arm comprising a manually rotatable element, an index so connected to said manually rotatable element as to move concomitantly with the latter, internal and external intermeshing screw threads, one of said threads being carried by the manually rotatable part and the other of said threads being carried by the arm.

14. In an instrument wherein a Bourdon tube constitutes motor means operative by movement of the tube tip in response to internal pressure variations to actuate an electrical switch, a rotatable support to which the butt end of the tube is fixed, said support having an elongate arm by means of which the support may be turned thereby to vary the initial position of the tube tip relatively to the movable member of the switch, and means for swinging the arm comprising a manually rotatable element, an index so connected to said manually rotatable element as to move concomitantly with the latter, the arm having a gear sector at its end, and the manually rotatable element having a pinion which meshes with said gear segment.

15. In an instrument wherein a Bourdon tube constitutes motor means operative by movement of the tube tip in response to internal pressure variations to actuate a driven part, in combination a rotatable part upon which the Bourdon tube is mounted, said support having an elongate arm by means of which the support may be turned thereby to vary the initial position of the tube tip relatively to the driven part, a gear element fixed to the free end of the arm, a pinion meshing with said gear element, index means turning with the pinion for indicating the degree of rotation of the latter, and means for turning the pinion.

ELMER H. HAMMOND.
ALBERT J. DOSER.